United States Patent [19]
Takei

[11] Patent Number: 5,326,197
[45] Date of Patent: Jul. 5, 1994

[54] DRIVE APPARATUS

[75] Inventor: Seiji Takei, Kanagawa, Japan

[73] Assignee: Nippon Thompson Co., Ltd., Tokyo, Japan

[21] Appl. No.: 21,975

[22] Filed: Feb. 24, 1993

[30] Foreign Application Priority Data

Mar. 9, 1992 [JP] Japan .................. 4-085091

[51] Int. Cl.$^5$ .................. B23Q 1/14; B61B 13/00
[52] U.S. Cl. .................. 408/91; 74/89; 74/422; 105/30; 384/45; 476/67
[58] Field of Search .................. 408/87, 91, 234; 409/159, 163, 219, 235; 384/43, 44, 45, 49; 74/89, 422; 476/67; 105/30

[56] References Cited

U.S. PATENT DOCUMENTS

| | | | |
|---|---|---|---|
| 3,906,866 | 9/1975 | Knippel | 105/30 |
| 4,304,187 | 12/1981 | Becker et al. | 105/30 |
| 4,876,967 | 10/1989 | Postma | 105/30 |

FOREIGN PATENT DOCUMENTS 1176960 8/1964 Fed. Rep. of Germany ...... 409/219

Primary Examiner—Daniel W. Howell
Attorney, Agent, or Firm—Sughrue, Mion, Zinn, Macpeak & Seas

[57] ABSTRACT

A drive apparatus that is compact in size, low in cost, allows the attaining of a high degree of accuracy as well as high-speed driving, suppresses noise, and obtains both large thrust and braking force. The present invention is able to obtain the above-mentioned advantages of compact size, reduction of costs, high accuracy, high-speed driving and suppression of noise as a result of providing a torque generation device on a slider guided by a track rail, attaching a drive roller to which is torque is applied by an output shaft of the torque generation device, and that drive roller rolling along the track rail. In addition, the above-mentioned advantages of large thrust and braking force are obtained by forming indentations in at least one of either the track rail or drive roller with respect to the other track rail or drive roller.

9 Claims, 16 Drawing Sheets

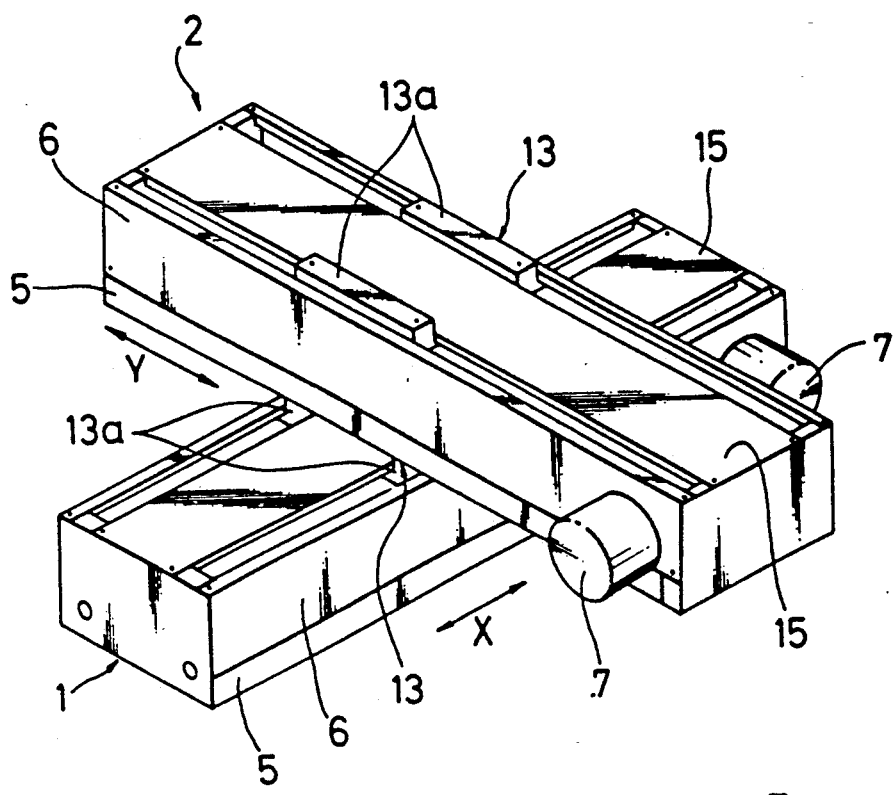
Fig.1
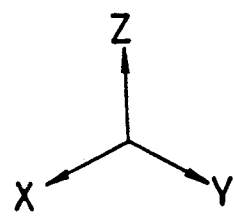
PRIOR ART

DRIVE APPARATUS

BACKGROUND OF THE INVENTION

1. Field of the Invention

The present invention relates to a drive apparatus for moving a certain object (driven object) in a desired direction.

1. Description of the Prior Art

An example of the prior art having this type of drive apparatus is the XY table indicated in FIG. 1.

As indicated in FIG. 1, said XY table is comprised of X table 1 installed on the floor or a mounting frame in a workshop, and Y table 2 moved by said X table 1. Furthermore, since X table 1 and Y table 2 mutually have nearly the same constitution, the following detailed explanation will be provided with respect to X table 1 only, and an explanation of Y table 2 is omitted. However, those constituent members of Y table 2 that correspond to the constituent members of X table 1 are indicated using the same reference numerals. Furthermore, an exploded view of the constituent members of X table 1 divided into suitable blocks is indicated in FIG. 2.

As indicated in FIG. 1, table 1 has a long, roughly rectangular plate-shaped base 5, and side plate 6, provided on said base 5 and forming a box with said base 5. Motor 7 is mounted on one end of this side plate 6. In addition, as is indicated in FIG. 2, pulley 9 is fit onto shaft 7a of motor 7. In addition, another pulley 10 is arranged on base 5, and is mounted to base 5 by means of brackets not shown. Endless belt 12 is wrapped around pulleys 9 and 10. A driven object of moving table 13 is fastened to this belt 12.

As indicated in the drawings, moving table 13 has a prescribed thickness and composed to be of a size that allows it to be contained within the width of side plate 6. Two table projections 13a projecting above the upper surface of side plate 6 are provided in parallel on the left and right sides. These table projections 13a may be formed into an integrated structure with moving table 13 or may be composed in the form of separate structures. Above-mentioned Y table 2 is mounted on the upper surface of said table projections. Furthermore, cover 15 is arranged to the inside of these table projections 13a, acting to prevent entrance of dust and so on.

A driving device that drives belt 12 is comprised of the above-mentioned motor 7, pulley 9 and 10.

On the other hand, as is indicated in FIG. 2, a pair of linear motion rolling guide units 17 are mutually arranged in parallel on the right and left sides of the above-mentioned belt 12, and are mounted on base 5. These linear motion rolling guide units 17 receive the load in all four directions (the directions indicated by arrows Z and Y as well as their respective opposite directions) applied to moving table 13, and act as guiding devices that guide moving table 13. The driving apparatus that moves moving table 13, the driven object, is composed of these linear motion rolling guide units 17, the above-mentioned belt 12 and its driving device.

More specifically, linear motion rolling guide unit 17 is composed of track rail 18, roughly in the shape of a square column, in which track groove 18a, having a roughly semi-circular cross-section, is formed along the axial direction in left and right shoulders of the side wall, and slider 20, which is guided by said track rail 18. In addition, this slider can slide relative to track rail 18 being straddled across said track rail 18. Said slider 20 also has casing 20a, in which track grooves (not shown), having a semi-circular cross-section, are formed in the inside surface so as to oppose track grooves 18a of said track rail 18, a plurality of balls (not shown) that are able to roll over a track path formed by both said track grooves in relative motion, and end caps 20b mounted on both ends in the lengthwise direction of said casing.

Furthermore, linear motion rolling guide units 17 are not limited to the use of balls, but may also use other devices such as rollers as long as they are of a constitution that uses a rolling object. In addition, although the track equipped on track rail 18 in said example of the prior art is in the form of track groove 18a, in addition to said constitution, projections (not shown) may be provided over roughly the entire length of the side wall surface of track rail 18, with the track surface formed by these projections then used as the track.

The following provides an explanation of the operation of the XY table having the above-mentioned constitution. Furthermore, since X table 1 and Y table 2 have the same described above, the following explanation will deal primarily with X table 1.

Firstly, when a power voltage is supplied to motor 7 of X table 1, output shaft 7a of motor 7, serving as the driving source, rotates which transmits torque to pulley 9. Then, belt 12, wrapped around pulley 9 and pulley 10, is driven in a prescribed direction, and moving table 13, mounted on the upper surface of this belt 12, also moves guided by linear motion rolling guide units 17. Conversely, when the direction of rotation of motor 7 is reversed, belt 12 is driven in the opposite direction from that above, and consequently, moving table 13 also moves in that direction. In addition, the movement of moving table 13 is controlled by a control circuit composed of a microcomputer and so on. A detector, which outputs a position detection signal to this control circuit, is composed to be able to be mounted to the inside of side plate 6 indicated in FIG. 1, and on the upper surface of base 5. In addition, detection may also be performed by an encoder mounted behind motor 7.

In addition, since Y table 2 is mounted on table projections 13a of moving table 13 equipped on X table 1, it moves in the same direction as moving table 13 of X table 1. As moving table 13 of Y table 2 is composed so as to be able to independently move linearly in the Y direction, by controlling the tables with a control circuit not shown, moving table 13 of Y table 2 can be moved in both the X and Y directions.

FIG. 3 indicates the drive apparatus of a second example of the prior art. This drive apparatus can be incorporated into the XY table indicated in FIG. 1 in the same manner as the drive apparatus of the first example of the prior art indicated in FIG. 2.

As indicated in FIG. 3, said drive apparatus has long ball screw 26, provided in parallel with track rail 18 equipped with linear motion rolling guide unit 17, and attached at both ends to base 5 by means of support bearings 25, motor 27 that rotates said ball screw 26, and nut member 28 engaging with ball screw 26 and mounted with respect to moving table 13, the driven object.

Furthermore, since the drive apparatus indicated in FIG. 3 is composed in the same manner as the first example of a drive apparatus of the prior art indicated in FIG. 2 with respect to portions other than those described above, an explanation of the entire apparatus will be omitted. In addition, in the above-mentioned explanation, the same reference numerals are used for those constituents that are identical to the constituents equipped on the first example of the prior art.

In the second example of a drive apparatus of the prior art, when ball screw 26 is driven to rotate by motor 27, moving table 13 moves together with nut member 28.

As described above, in addition to linear motion rolling guide unit 17 for guiding of the driven object, the drive apparatus of the prior art has long components for transmission of driving force, such as belt 12 or ball screw 26, motors 7 and 27, that serve as the driving source, and several other peripheral components, such as pulleys and bearings, related to these. Accordingly, this drive apparatus has the shortcomings of being large in size and having a large number of components resulting in high costs. In addition, since the driving force produced by motors 7 and 27, serving as the driving sources, is transmitted through numerous members, such as long components for transmission of driving force, this drive apparatus has the additional shortcoming of it being difficult to attain a high degree of accuracy in movement and positioning of the driven object. Moreover, in addition to the fact that it is not always easy to attain high-speed driving with this drive apparatus, due to the large number of components operating relative to each other, this drive apparatus has the shortcoming of producing a relatively high level of noise. In the case of using the above-mentioned belt 12 in particular, since said belt becomes stretched due to application of torque, together with positioning accuracy being poor, there is also the shortcoming of dust and debris being produced from said belt 12. In addition, in the case of the above-mentioned ball screw 26, since deflection of the screw shaft occurs when this is excessively long, sliding characteristics become unstable.

SUMMARY OF THE INVENTION

In consideration of the above-mentioned shortcomings of the prior art, the object of the present invention is to provide a drive apparatus that is compact in size, low in cost, allows the attaining of a high degree of accuracy as well as high-speed driving, suppresses the production of noise, and obtains both large thrust and braking force.

The present invention comprises: a track rail having a track formed along the axial direction; a slider guided by the above-mentioned track; a torque generation device mounted on the above-mentioned slider; and, a driver roller that rolls while engaging with the above-mentioned track rail by application of torque by the output shaft of the above-mentioned torque generation device; wherein, indentations are formed in the engaging surface of at least either the above-mentioned track rail or the above-mentioned drive roller with respect to the other said track rail or said drive roller.

BRIEF DESCRIPTION OF THE DRAWINGS

FIG. 1 is a perspective view of an XY table equipped with an example of a drive apparatus of the prior art.

DESCRIPTION OF THE PREFERRED EMBODIMENTS

The following provides a detailed explanation of a drive apparatus in the form of embodiments of the present invention with reference to the attached drawings.

Firstly, FIGS. 4 through 8 indicate a drive apparatus as a first embodiment of the present invention.

Figure 2:
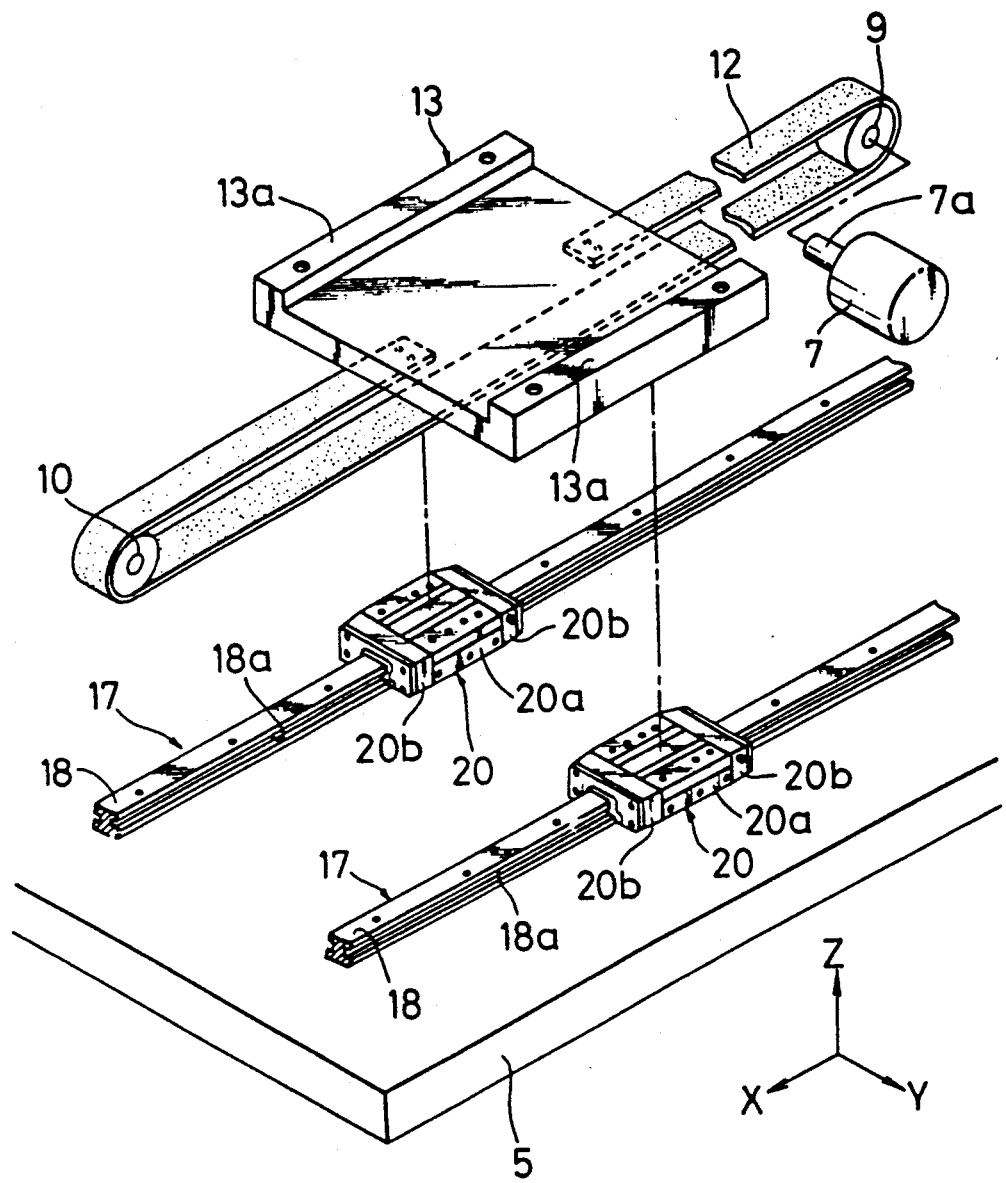
FIG. 2 is an exploded perspective view of a drive apparatus contained in the XY table indicated in FIG. 1.
Figure 3:
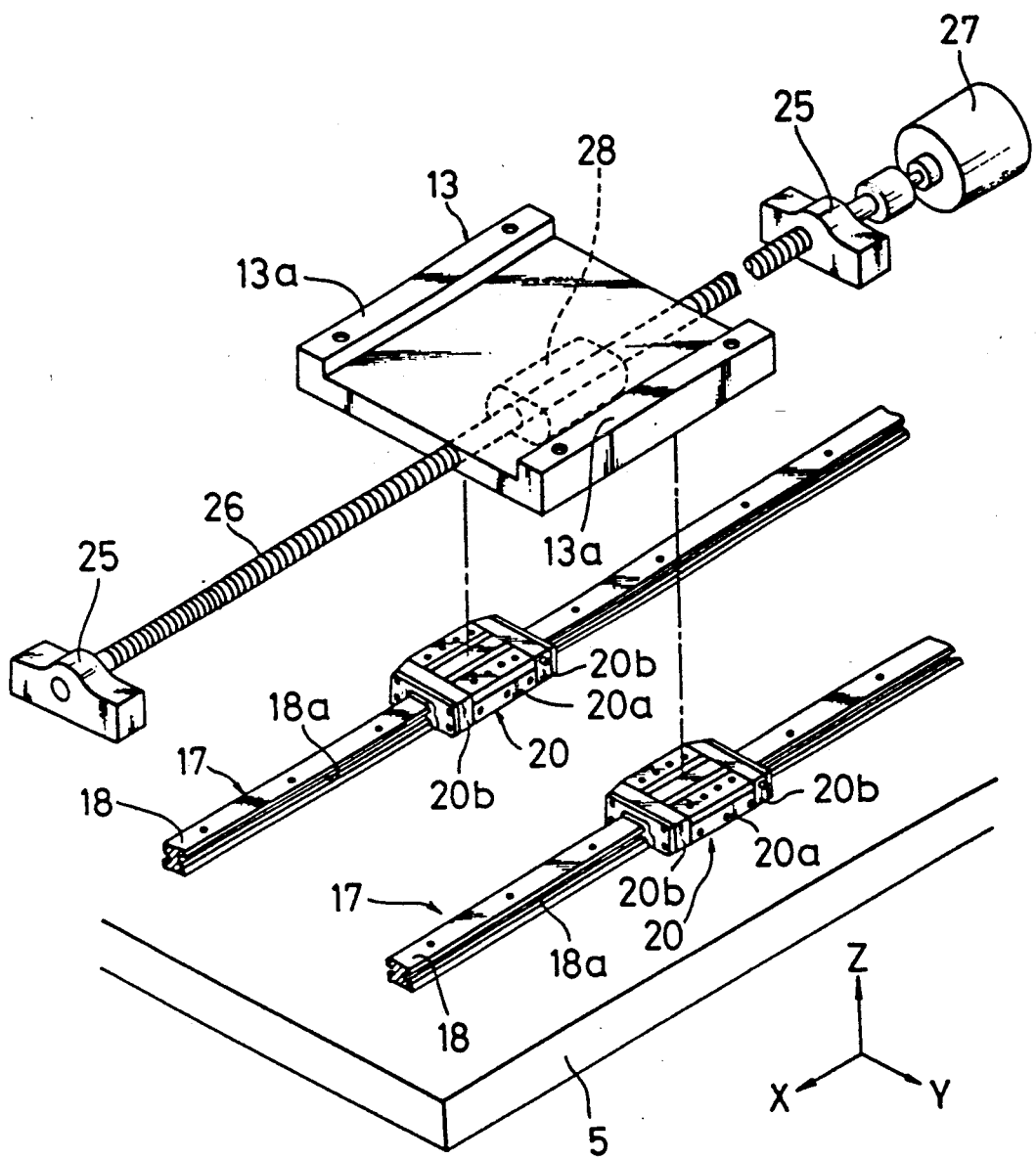
FIG. 3 is an exploded perspective view of a second example of a drive apparatus of the prior art.
Figure 4:
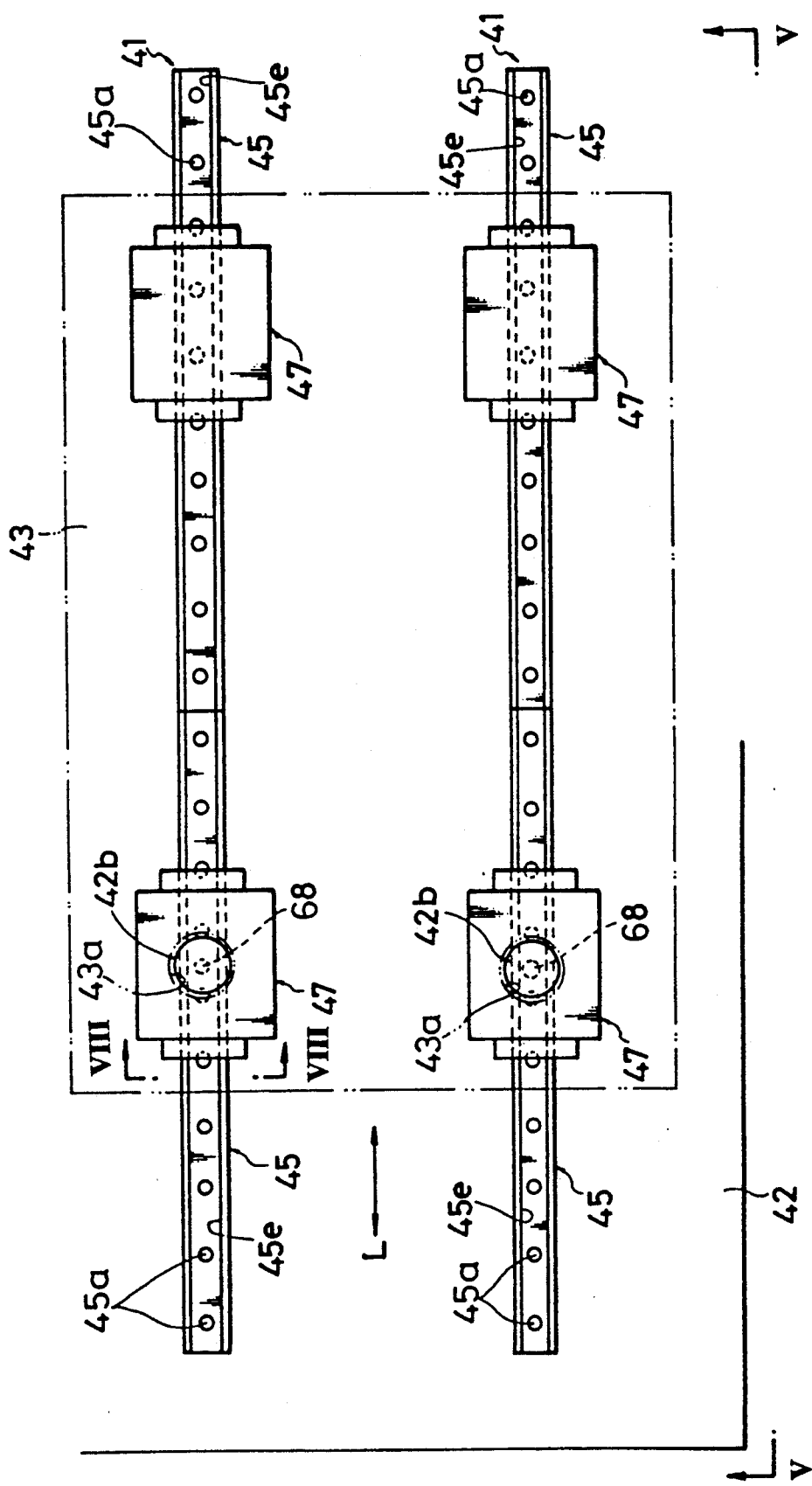
FIG. 4 is an overhead view indicating the drive apparatus of a first embodiment of the present invention mounted on the bed of a machine tool.
Figure 5:
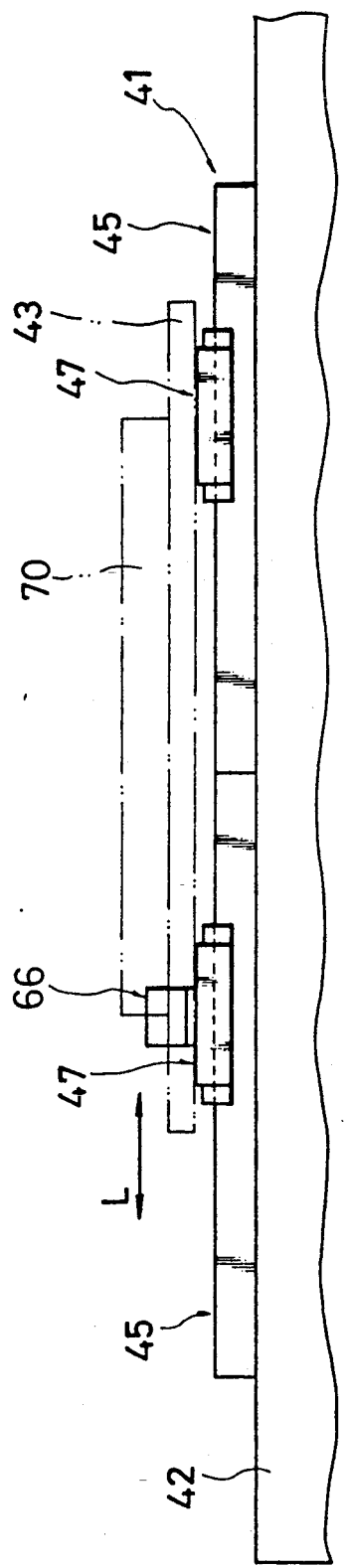
FIG. 5 is a view taken along arrows V—V relating to FIG. 4.

In FIGS. 4 and 5, two sets of this drive apparatus 41 are provided mutually in parallel on a frame, or in other words, bed 42 of a machine tool (the entire machine tool is not shown), and support and move in concert with table 43.

Figure 6:
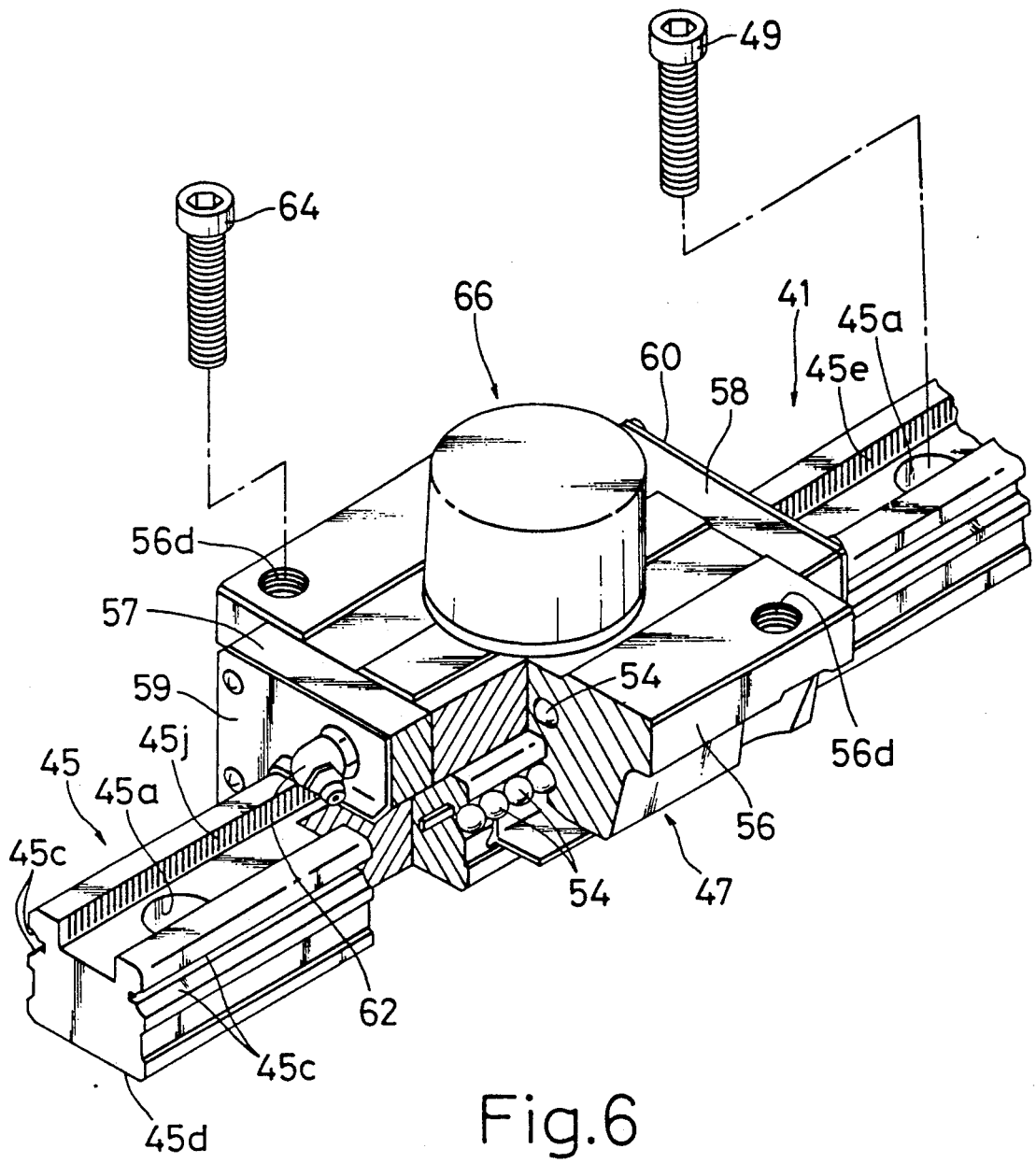
FIG. 6 is a perspective view, including a partial cross-section, of the essential components of the drive apparatus indicated in FIG. 4 and FIG. 5.

Drive apparatus 41 has two linear track rails 45 mounted in a single row on bed 42, and two slide units 47 in the form of sliders that are guided by said track rails 45. Furthermore, as indicated in FIG. 6, each track rail 45 is fastened to bed 42 by a plurality of bolts (with hexagon sockets) 49. More specifically, as is clear from FIGS. 7 and 8 in particular, countersunk portions 45a, having a diameter larger than the heads of bolts 49 for fastening said track rail 45 to bed 42, and insertion holes 45b, having a diameter slightly larger than the threaded portions of bolts 49, are concentrically formed in said track rail 45. Bolts 49 are screwed into bed 42 by being inserted into said countersunk portions and insertion holes so that they are completely embedded beneath the surface of said bed 42.

Figure 7:
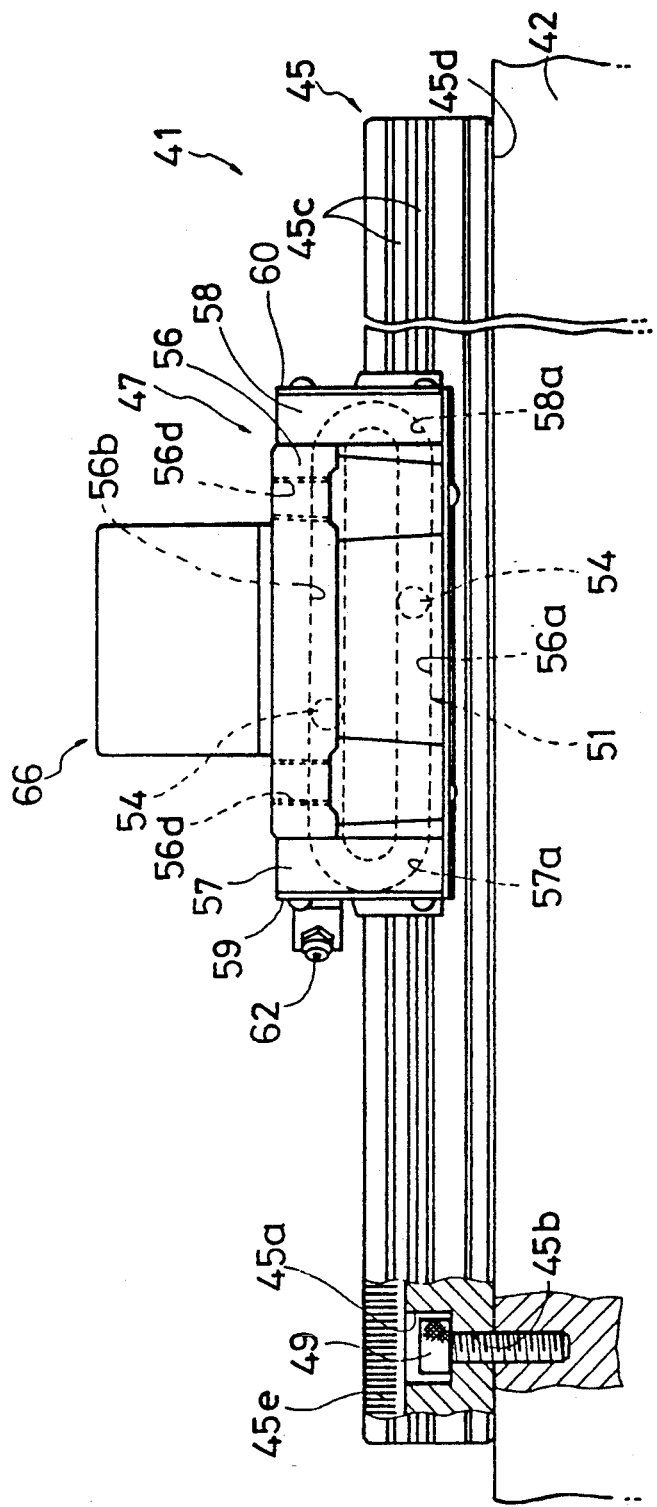
FIG. 7 is a side view, including a partial cross-section, of the essential components of the drive apparatus indicated in FIG. 4 and FIG. 5.
Figure 8:
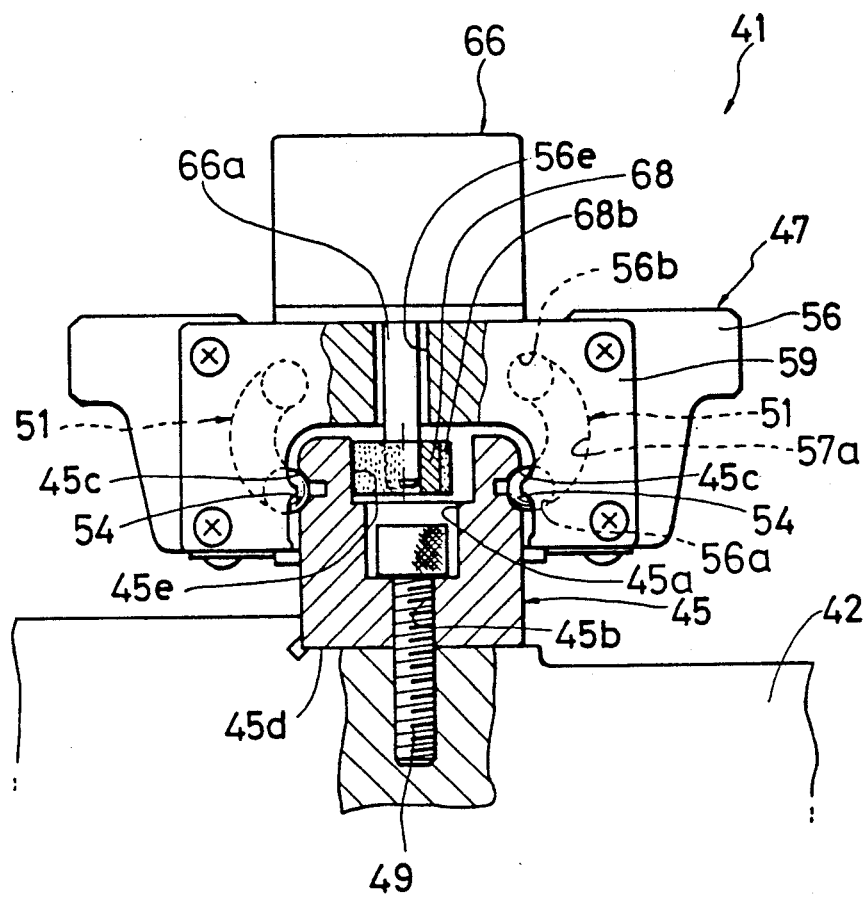
FIG. 8 is a view taken along arrows VIII—VIII, including a partial cross-section, relating to FIG. 4.

As is indicated in FIGS. 6 through 8, track rail 45 has a total of two tracks in the form of track grooves 45c, with one each located on both the left and right sides of said track rail 45. Said track grooves 45c are formed extending along the axial direction of said track rail 45, and have roughly semi-circular cross-sections. In addition, track rail 45 also has a flat mounting surface 45d on its bottom for fastening to bed 42. Slide unit 47 is straddled on track rail 45, and as indicated in FIG. 7 and FIG. 8, has two internal rolling element circulating paths 51 corresponding to each of the above-mentioned track grooves 45c (the details of which are to be described hereafter). A plurality of rolling elements in the form of balls 54 are arranged and contained within these rolling element circulating paths 51 so as to be able to move freely relative to each other. Each ball 54 rolls over track groove 45c accompanying movement of slide unit 47, thus resulting in circulation. As indicated in the drawings, slide unit 47 has casing 56, a pair of end caps 57 and 58 coupled to both the front and back ends of said casing 56, and two seals 59 and 60 mounted on the outsides of each of said end caps. As is clear from FIG. 7, above-mentioned rolling element circulating path 51 is composed of load bearing track groove 56a and return path 56b, each formed linearly and in parallel with casing 56, and a pair of roughly semi-circular directional change paths 57a and 58a formed in both end caps 57 and 58, that connect said bearing track groove 56a and return path 56b at both of their ends. Furthermore, grease nipple 62 is attached on end cap 57 for supplying grease to the surfaces of the above-mentioned balls 54. In addition, as indicated in FIGS. 6 and 7, a plurality of threaded holes 56d are formed in the upper side, or in other words the supporting side, of casing 56 of slide unit 47. Table 43, indicated in FIGS. 4 and 5, is then fastened to said casing 56 by bolts (with hexagon sockets) 64 screwed into these threaded holes 56d.

However, as indicated in FIGS. 4 through 8, motor 66 is mounted as a torque generation device in the center of the upper surface of casing 56 of slide unit 47. As is clear from FIG. 8, this motor 66 is attached so that its output shaft 66a is perpendicular to mounting surface 45d of said track rail 45, and in this case, facing downward. Furthermore, as indicated in FIG. 4, since motor 66 is provided on the upper surface of slide unit 47, or in other words on the side of the support surface that supports table 43, motor 66 is inserted into through holes 43a formed in said table 43 so that said motor 66 does not interfere with table 43.

As indicated in FIG. 8, output shaft 66a of motor 66 protrudes below the surface of casing 56 via through hole 56e formed in said casing 56 of slide unit 47. Cylindrical drive roller 68 then fits into this protruding portion. Furthermore, this drive roller 68 is also shown in FIG. 4.

On the other hand, as is indicated in FIG. 4, FIG. 6 and FIG. 7, track surface 45e is formed in the upper portion of track rail 45 in parallel with track groove 45c equipped on said track rail 45 to allow the above-mentioned drive roller 68 to roll while engaging with said track surface 45e. More specifically, a single groove having a rectangular cross-section is formed along the axial direction in the upper portion of track rail 45, and one of the inside surfaces of this groove serves as track surface 45e.

The following provides a detailed explanation of the relationship between the engaging of drive roller 68 and track rail 45.

As indicated in FIGS. 6 and 7, indentations in the form of knurlings 45j (the reference numeral is only shown in FIG. 6) are formed in track surface 45e, formed in track rail 45 over which drive roller 68 is to roll, and over roughly the entire length of said track surface 45e. These knurlings 45j have flat openings, and these openings are formed to be parallel to the rotating shaft of drive roller 68.

On the other hand, as indicated in FIG. 8, an elastic member having a high friction coefficient, in this case rubber 68b, is attached to the outside surface, or in other words the surface that engages with the above-mentioned track surface 45e, of drive roller 68. This rubber 68b then engages with the above-mentioned knurlings 45j.

In the drive apparatus of the above-mentioned constitution, when motor 66 operates with workpiece 70, etc., placed and fastened on table 43 as indicated in FIG. 5, drive roller 68 rolls over track surface 45e. Accordingly, table 43 moves either back or forth as in the manner indicated with arrow L together with each slide unit 47 that support said table 43. The desired processing, such as cutting and so on, is then performed on workpiece 70, etc., accompanying this movement.

Furthermore, as mentioned above, knurlings 45j are formed in track surface 45e, and rubber 68b is attached to drive roller 68. Accordingly, when drive roller 68 rolls over track surface 45e as described above, a large amount of friction is produced between the surfaces of both said drive roller 68 and track surface 45e, thus resulting in increased thrust.

Figure 9:
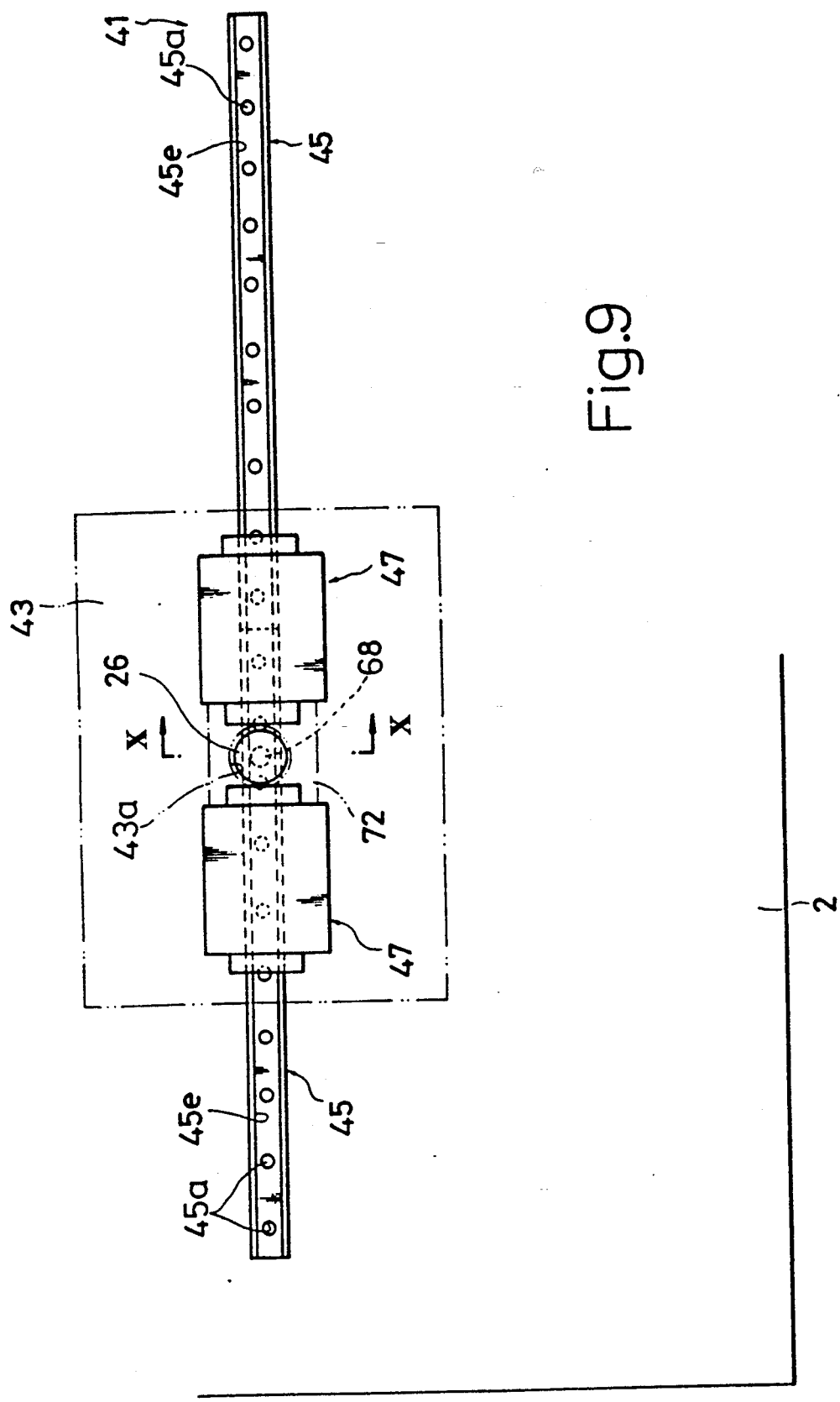
FIG. 9 is an overhead view indicating the drive apparatus of a second embodiment of the present invention mounted on the bed of a machine tool.
Figure 10:
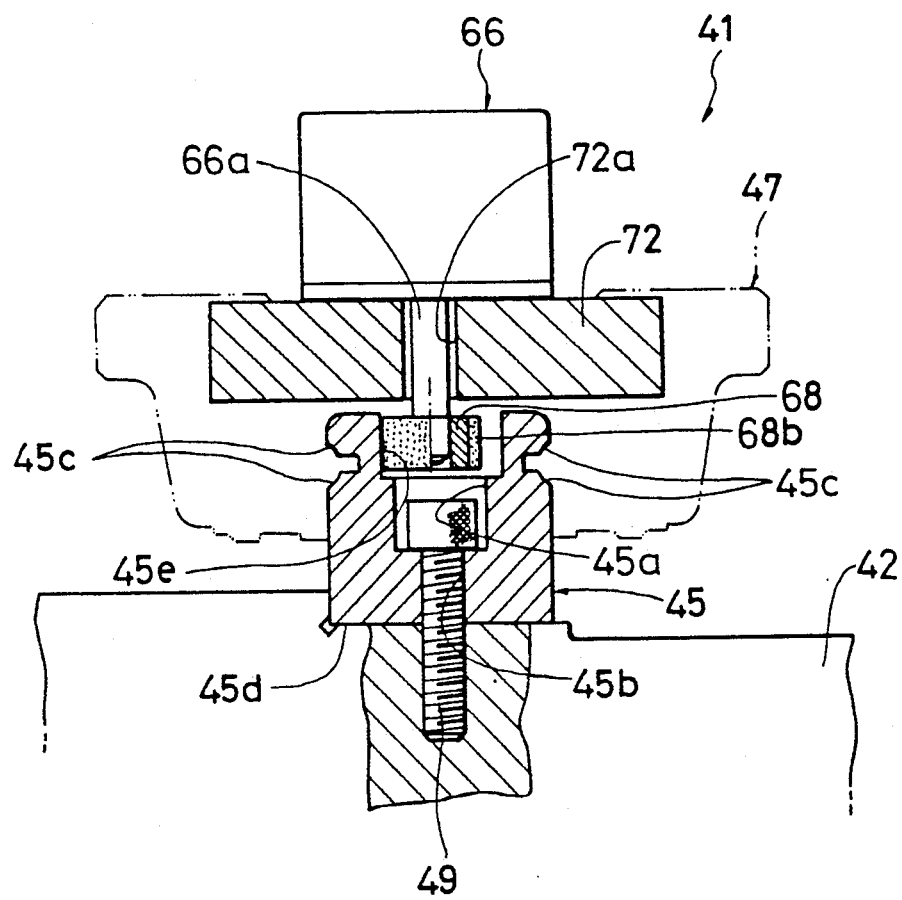
FIG. 10 is a cross-sectional view taken along arrows X—X relating to FIG. 9.

FIGS. 9 and 10 indicate the essential components of the drive apparatus of a second embodiment of the present invention. Furthermore, since the drive apparatus pertaining to this second embodiment is composed similar to the drive apparatus of the first embodiment indicated in FIGS. 4 through 8 with the exception of the essential components explained below, an explanation of this entire drive apparatus has been omitted. In addition, in the explanation provided below, the same reference numerals are used for those members that are either identical or correspond to constituent members of the drive apparatus of the first embodiment. Moreover, this applies similarly to other embodiments to be described hereafter.

As indicated in FIGS. 9 and 10 of the subject drive apparatus, a plurality of slide units, in the form of two sliders arranged in a row in this case, are each coupled into a single unit by coupling member 72 roughly in the shape of a flat plate. Motor 66 is mounted on the top of this coupling member 72, and output shaft 66a of said motor 66 is inserted into through hole 72a formed in said coupling member 72.

Figure 11:
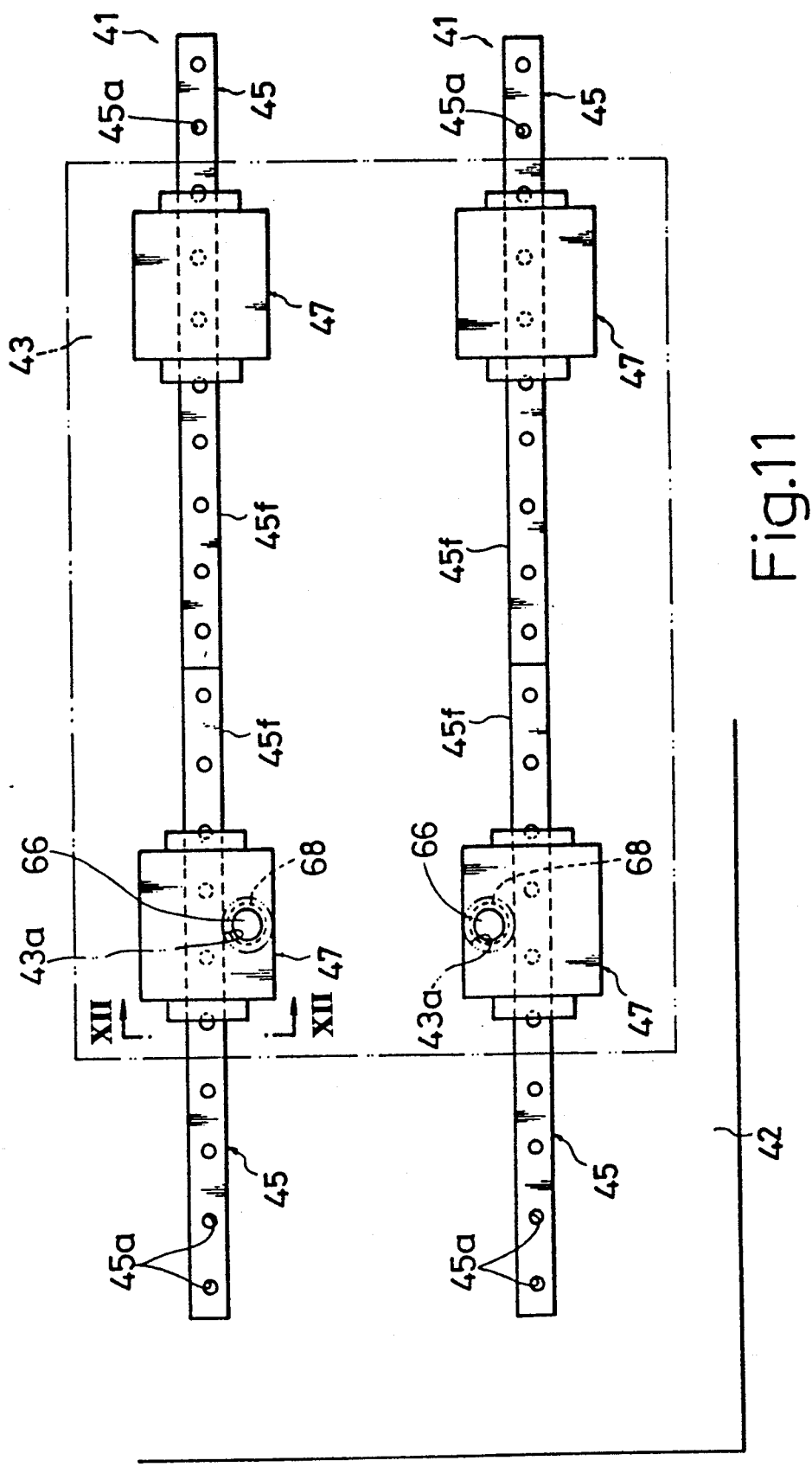
FIG. 11 is an overhead view indicating the drive apparatus of a third embodiment of the present invention mounted on the bed of a machine tool.
Figure 12:
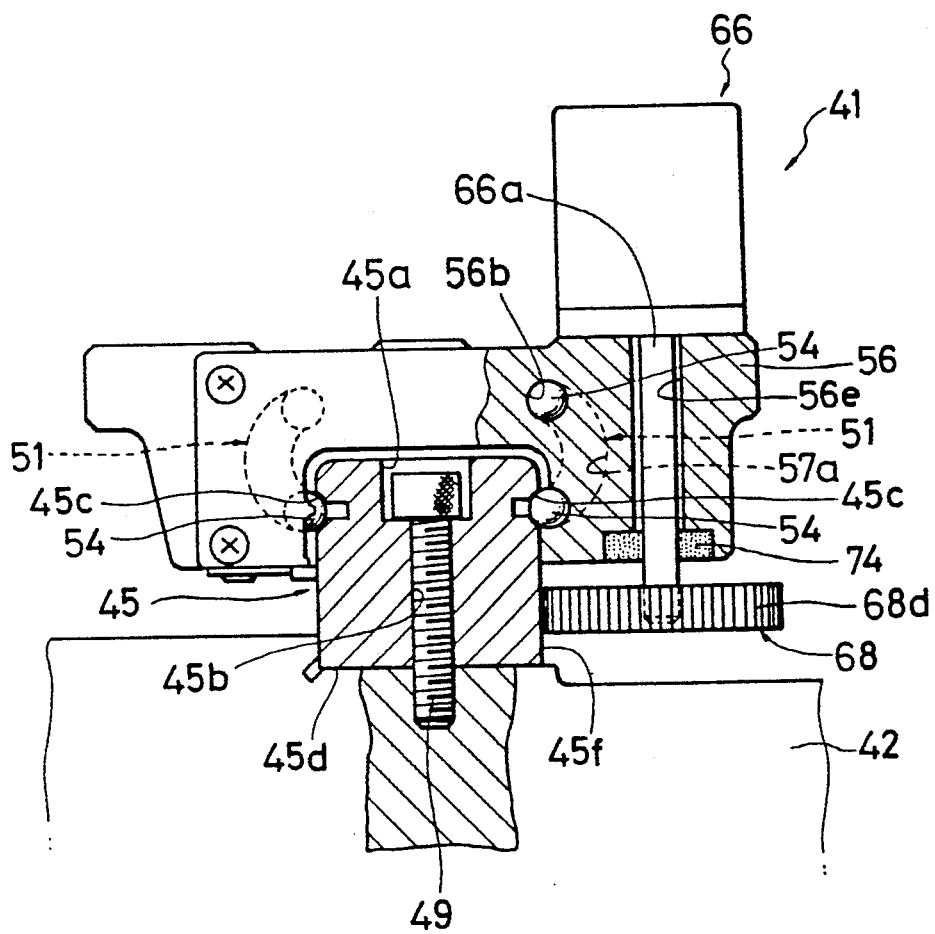
FIG. 12 is a view taken along arrows, including a partial cross-section, taken along arrows XII—XII relating to FIG. 11.
Figure 13:
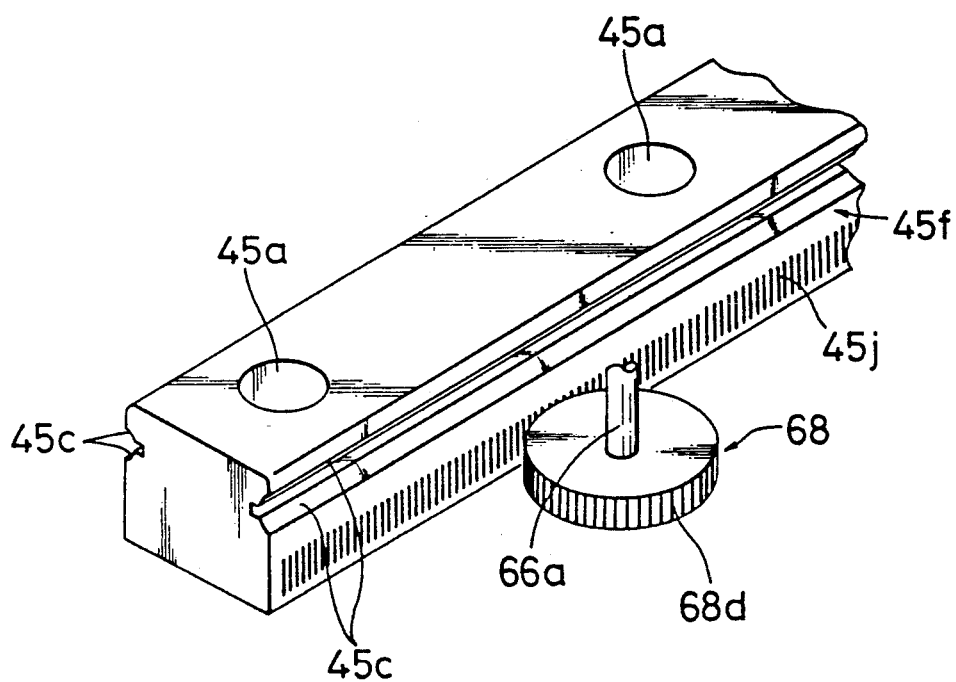
FIG. 13 is a perspective view of the essential components of the drive apparatus indicated in FIG. 11 and FIG. 12.

FIGS. 11 through 13 indicate the essential components of a drive apparatus in the form of a third embodiment of the present invention. As indicated in FIGS. 11 and 12, a torque generation device in the form of motor 66 is provided on the upper surface of casing 56 of slide unit 47 so that its output shaft 66a is perpendicular to mounting surface 45d of track rail 45. Drive roller 68, fit onto the end of said output shaft 66a, then rolls along side surface 45f while engaging with said side surface 45f of track rail 45. Furthermore, output shaft 66a is supported in the vicinity of its end by casing 56 of slide unit 47 by means of bearing 74 comprising a ball bearing or oilless bearing. Thus, grooves formed in track rail 45 to provide track surface 45e are not required in the drive apparatuses of the above-mentioned first and second embodiments as a result of using side surface 45f of track rail 45 as the rail surface. This allows this embodiment to offer the advantage of allowing an ordinary track rail to be used as is.

As indicated in FIG. 13, indentations in the form of knurlings 45j are formed in side surface 45f of track rail 45 over which drive roller 68 rolls, and said knurlings 45j are formed roughly over the entire length of track rail 45. In addition, as indicated in FIG. 12, similar knurlings 68d are formed in the outside surface of drive roller 68, or in other words, the surface that engages with track rail 45. These knurlings 45j and 68d are flat openings that are parallel to the rotating shaft of said drive roller 68. As a result of forming these knurlings 45j and 68d, the frictional force between the surfaces of drive roller 68 and side surface 45f is increased resulting in a large amount of thrust when said drive roller 68 rolls along side surface 45f of track rail 45.

Figure 14:
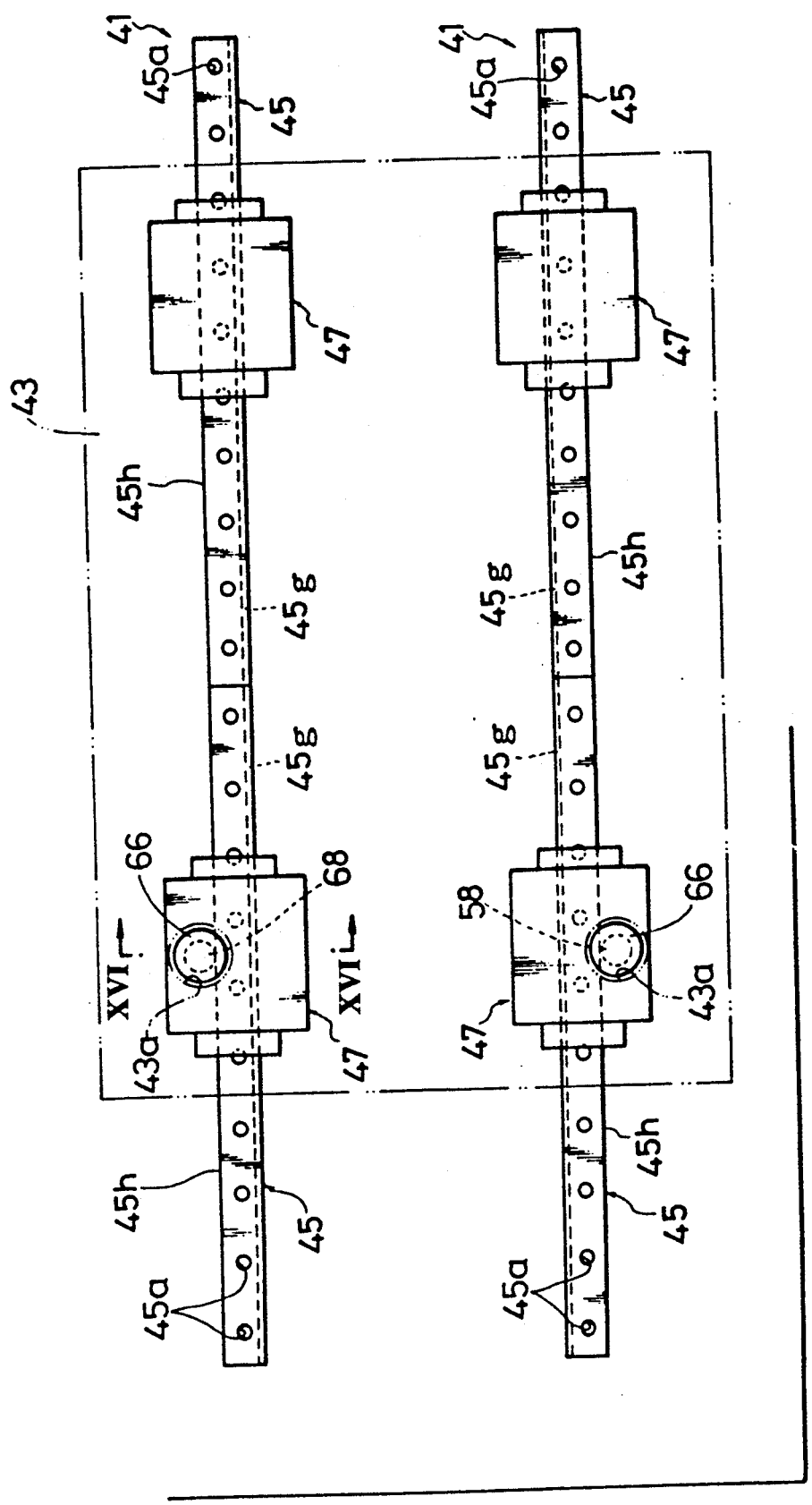
FIG. 14 is an overhead view indicating the drive apparatus of a fourth embodiment of the present invention mounted on the bed of a machine tool.
Figure 15:
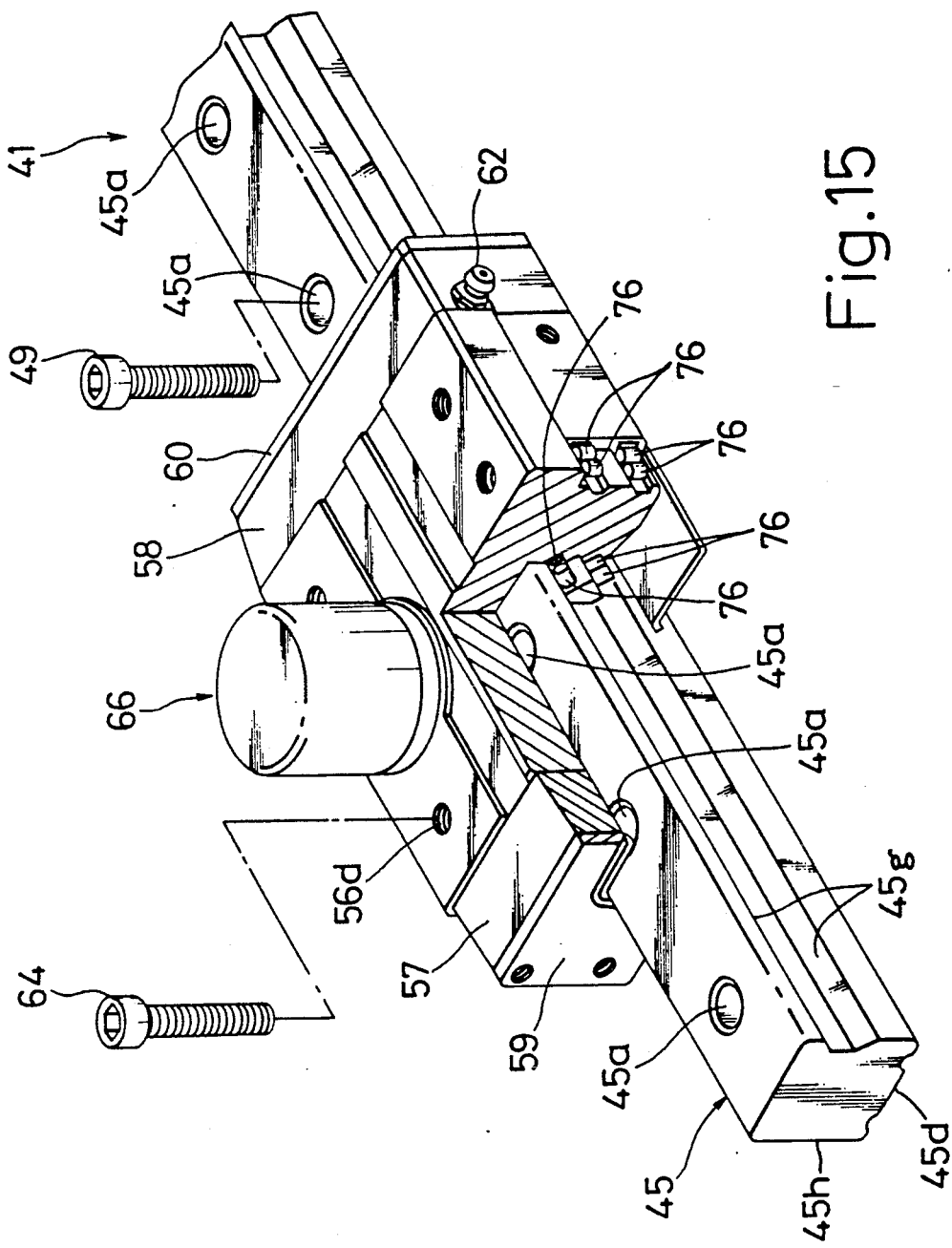
FIG. 15 is a perspective view, including a partial cross-section, of the essential components of the drive apparatus indicated in FIG. 14.
Figure 16:
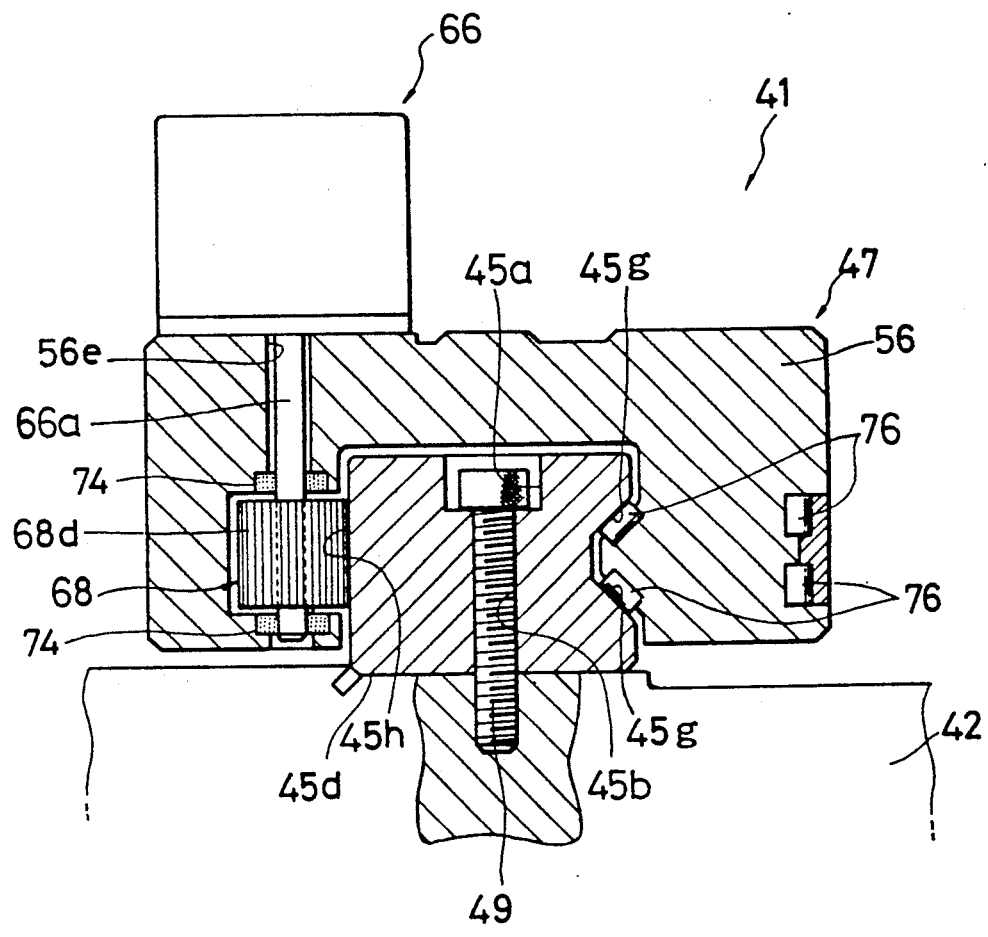
FIG. 16 is a cross-sectional view taken along arrows XVI—XVI relating to FIG. 14.

FIGS. 14 through 16 indicate the essential components of a drive apparatus in the form of a fourth embodiment of the present invention. As indicated in FIGS. 15 and 16, the rolling element contained within slide unit 47 is cylindrical roller 76 in this drive apparatus. Accordingly, the rail formed in track rail 45 for rolling of this roller 76 is in the form of flat rail surface 45g. Two of these rail surfaces 45g are formed on one side of track rail 45. In addition, the other side surface 45h of track rail 45 is formed into a flat surface.

On the other hand, two rolling element circulating paths, formed in slide unit 47 for circulation of roller 76, are formed in one side of said slide unit 47 corresponding to the above-mentioned track surface 45g. Motor 66 is arranged facing downward on the upper surface of the other side of slide unit 47. Drive roller 68 is fit onto output shaft 66a of said motor 66, and said drive roller 68 is formed into a cylindrical shape to engage with the other side surface 45h of track rail 45. Furthermore, output shaft 66a of motor 66 is supported at two locations on both sides of driver roller 68 by casing 56 of slide unit 47 by means of bearing 74 comprising a ball bearing or oilless bearing.

As indicated in FIG. 16, knurlings 68d are formed in the outside surface of drive roller 68, or in other words the surface that engages with track rail 45. In contrast, knurlings (not shown) are also formed over the entire length of side surface 45h which acts as the track surface over which said drive roller 68 rolls. These knurlings formed in drive roller 68 and track rail 45 are flat openings, and these openings are parallel with the rotating shaft of drive roller 68.

In the above-mentioned constitution as well, frictional force is increased due to the action of each of said knurlings when drive roller 68 rolls along side surface 45h of track rail 45, resulting in a large amount of thrust.

Furthermore, it goes without saying that the present invention is not limited to the constitutions of the above-mentioned first through fourth embodiments, but can realize a diverse range of constitutions by suitably combining the constitutions of two more of the above-mentioned embodiments either wholly or partially.

In addition, in each of the above-mentioned embodiments, although balls 54 and rollers 76 circulate within slide unit 47 accompanying movement of said slide unit 47, said embodiments are not limited to said constitution, but other constitutions may naturally be applied as well.

Moreover, although the case of using motor 66 for the torque generation device is indicated in each of the above-mentioned embodiments, various other torque generation devices, such as that combining a motor and a speed reduction mechanism, can also be applied.

In addition, although drive roller 68 is directly attached to output shaft 66a of motor 66 in each of the above-mentioned embodiments, a constitution may be employed in which drive roller 68 is attached to casing 56, and a speed reduction mechanism, etc., is installed between said drive roller 68 and motor 66.

In addition, although knurlings are formed in both track rail 45 and driver roller 68 in the above-mentioned third embodiment, and in only drive roller 68 in the above-mentioned fourth embodiment, another constitution may also be employed wherein knurlings are only formed in track rail 45 and not in the drive roller.

Finally, although the knurlings formed in track rail 45 or drive roller 68 in each of the embodiments are in the form of flat openings, other forms of knurlings, such as those in the form of crossed openings, may be formed in place of said knurlings in the form of flat openings, or alternatively, indentations other than knurlings may also be formed.

According to the present invention as described above, since driving of a slider is performed by a torque generation device installed to have a compact form, the present invention offers the first advantage of allowing the overall size of the drive apparatus to be reduced.

In addition, since the above-mentioned driving is only the result of directly engaging a track rail and a drive roller to which torque is applied by the output shaft of a torque generation device, a member for transmitting driving force is not required resulting in reduced costs, thereby offering the second advantage of the present invention.

Moreover, since a driving force transmission member is not provided between the drive roller and track rail as indicated above, in comparison with apparatuses of the prior art in which driving force is transmitted through numerous driving force transmission members, movement of the driven object and positioning accuracy, which are effected by the number of components and manufacturing accuracy, are dramatically improved, thereby resulting in the third advantage of the present invention.

In addition, since the total weight of moving components consisting of the slider and torque generation device is small, together with it being easy to drive the drive apparatus at high-speed, since the number of components operating relative to each other is also low, the present invention offers the fourth advantage of allowing suppression of noise to a low level.

In addition, since indentations are formed in at least one of either of the mutually engaging surfaces of the above-mentioned track rail and drive roller in the drive apparatus according to the present invention, both large thrust and braking force are able to be obtained, thus offering the fifth advantage of the present invention.

What is claimed is:

1. A drive apparatus comprising:
   a track rail having a track formed along the axial direction;
   a slider guided by said track;
   a torque generation device mounted on said slider; and
   a drive roller that rolls while engaging with said track rail by application of torque by an output shaft of said torque generation device;
   wherein, indentations are formed in an engaging surface of at least either said track rail or said driver roller with respect to the other of said track rail or said drive roller, and wherein the side surface of said track rail serves as the track surface over which said driver roller is to roll.

2. The drive apparatus of claim 1 wherein said indentations are comprised of knurlings.

3. The drive apparatus of claim 1 wherein said indentations are formed in said track rail, and an elastic member having a high friction coefficient is attached on the surface of said drive roller that engages with said track rail.

4. A drive apparatus comprising:
- a track rail having a track formed along the axial direction;
- a slider guided by said track, said slider having a rolling element circulating path in which a plurality of rolling elements are disposed between said slider and said track rail;
- a torque generation device mounted on said slider; and
- a drive roller that rolls while engaging with said track rail by application of torque by an output shaft of said torque generation device;
- wherein, indentations are formed in an engaging surface of at least either said track rail or said driver roller with respect to the other of said track rail or said drive roller, and wherein said rolling elements circulate within said rolling element circulating path to facilitate the movement of said slider along said track rail.

5. The drive apparatus of claim 4, wherein said drive roller is in contact with said track rail.

6. The drive apparatus of claim 4, wherein said indentations are comprised of knurlings.

7. The drive apparatus of claim 4, wherein a groove is formed in the upper portion of said track rail along the axial direction, and the inside surface of said groove serves as the track surface over which said drive roller rolls.

8. The drive apparatus of claim 4, wherein the side surface of said track rail serves as the track surface over which said driver roller rolls.

9. The drive apparatus of claim 4, wherein said indentations are formed in said track rail, and an elastic member having a high friction coefficient is attached on the surface of said drive roller that engages with said track rail.

* * * * *